United States Patent [19]
Bandurick

[11] 3,957,393
[45] May 18, 1976

[54] TURBINE DISK AND SIDEPLATE CONSTRUCTION
[75] Inventor: Donald J. Bandurick, East Hartford, Conn.
[73] Assignee: United Technologies Corporation, Hartford, Conn.
[22] Filed: Oct. 29, 1974
[21] Appl. No.: 518,826

[52] U.S. Cl. .............................. 416/220 R; 416/95
[51] Int. Cl.² ......................... F01D 5/30; F01D 5/32
[58] Field of Search ............416/220, 219, 193, 95

[56] References Cited
UNITED STATES PATENTS

| | | | |
|---|---|---|---|
| 2,985,426 | 5/1961 | Hunter et al. | 416/220 |
| 2,998,959 | 9/1961 | Haworth et al. | 416/220 |
| 3,572,966 | 3/1971 | Borden | 416/220 |
| 3,666,376 | 5/1972 | Damlis | 416/220 X |
| 3,678,555 | 7/1972 | Hansen | 416/95 X |
| 3,734,646 | 5/1973 | Perkins | 416/220 |

*Primary Examiner*—Irwin C. Cohen
*Attorney, Agent, or Firm*—Robert C. Walker

[57] ABSTRACT

A turbine wheel assembly having an improved disk and sideplate construction is disclosed. A multiplicity of turbine blades is conventionally mounted on a turbine disk which includes a plurality of sideplate retaining lugs along the periphery of the disk. A plurality of segmented sideplates is affixed to the side of the disk and each blade has a root section which engages a correspondingly shaped slot in the disk. The lugs include an arcuate surface to engage a corresponding bearing surface on one of the sideplates and to radially retain the sideplate during rotation of the wheel assembly. Additionally, the rotation of the wheel assembly urges the sideplate axially against the side of the disk to seal the interface between the blade root sections and the corresponding disk slots.

8 Claims, 3 Drawing Figures

U.S. Patent  May 18, 1976  3,957,393
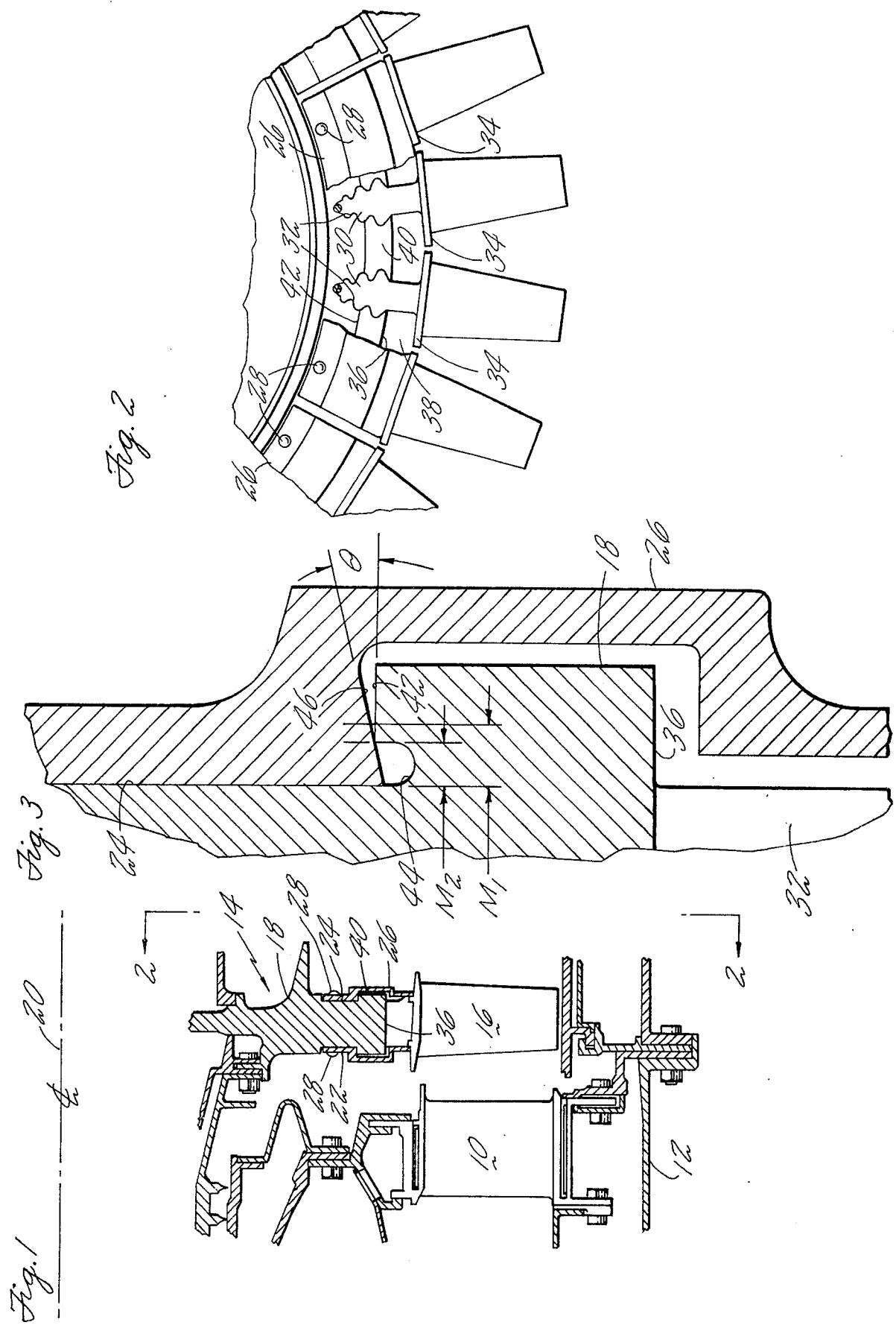

TURBINE DISK AND SIDEPLATE CONSTRUCTION

BACKGROUND OF THE INVENTION

1. Field of the Invention

The present invention relates to turbine engines and more specifically to the disk and sideplate constructions of turbine wheel assemblies.

2. Description of the Prior Art

A typical turbine wheel assembly in a gas turbine engine comprises a rotor shaft to which one or more disk and blade assemblies are attached. Each disk and blade assembly includes a multiplicity of turbine blades each having a root section which engages a corresponding root cavity at the periphery of the disk member. The root cavities of the disk are oriented in an essentially axial direction and extend through both sides of the turbine disk. A plurality of segmented sideplates is attached to at least one side of the disk by rivets or other suitable means. The sideplates cover the root sections of the blades to axially retain the blades and to prevent the leakage of working medium between successive stages through the interfaces between the blade roots and the disk cavities. In many turbine constructions cooling air is provided through the disk to the root section of each turbine blade and in these constructions the turbine sideplates perform the additional function of axially sealing the turbine root cavities to prevent the premature flow of cooling air into the working medium flowpath.

Each turbine disk is a principal structural member of the wheel assembly. As the disk rotates the turbine blades and sideplates mounted thereon are thrust radially by centrifugal forces until they engage corresponding retaining surfaces on the disk. The walls of the root cavity comprise the blade retaining surface while a plurality of sideplate retaining lugs oppose radial movement of the sideplates. Each sideplate retaining lug has an arcuate surface which faces in a radially inward direction toward the axis of rotation of the wheel assembly and engages a corresponding sideplate bearing surface. A bending moment in the disk lug is developed about a moment arm extending from the base of the disk lug to the point of contact between the sideplate bearing surface and the arcuate surface of the lug. Rotor speeds in modern gas turbine engines commonly exceed 7,500 rpm and in one conventional construction tested generate bending stresses of approximately 58,000 pounds per square inch at the base of each retaining lug of the disk, the stresses being proportional to the length of the moment arm described above.

Although design stresses are always lower than the yield strength of the affected material, fatigue cracks appear after repeated cycling to any given stress value. The point at which cracks begin to appear is known as the low cycle fatigue limit or LCF in which each cycle comprises and aircraft take-off, cruise and landing. At a maximum stress of 58,000 pounds per square inch psi as experienced in the construction tested, the LCF life of the disk is limited to between 1,200 to 1,500 cycles.

Increases in the cycle life of the turbine disk are required to bring the service life of that component into compatible relationship with economic operation of the gas turbine engine. Although cycle life increases can generally be effected by corresponding increases in material thickness, continuing efforts are underway to reduce maximum stresses at the base of each sideplate retaining lug during the take-off condition without undesirably adding to the total engine weight.

SUMMARY OF THE INVENTION

A primary object of the present invention is to improve the service life of rotor assemblies incorporated in gas turbine engines and more specifically to reduce the maximum stresses within turbine disks having sideplate retaining lugs.

This invention is predicated upon the recognition that the propensity for disk cracking in the vicinity of the sideplate retaining lugs is proportional to the moment arm between the base of the disk lug and the sideplate bearing point. As the moment arm is decreased the stresses which produce cracking correspondingly are decreased. Although the conventional moment arm appears insignificantly small, the service life of turbine disks can be increased several fold through incorporation of the present invention without increasing the thickness of the lug material.

According to the present invention a plurality of segmented sideplates, each having an inclined bearing surface facing in a radially outward direction is attached to a turbine disk having an axis of rotation and a face perpendicular to the axis of rotation; a plurality of sideplate retaining lugs, each having an arcuate surface which faces radially inward toward the axis of rotation of the disk, engages the sideplates to radially retain the sideplates during operation of the engine.

A primary feature of the present invention is the bearing surface of each sideplate which faces in an essentially radially outward direction but is slightly inclined to the axis of the disk with the most radially outward point on the bearing surface being in closest proximity to the perpendicular face of the disk. Another feature of the present invention is the undercut at the juncture of the perpendicular face and the arcuate surface of each sideplate retaining lug. Each sideplate has a sealing surface which opposes the perpendicular face of the disk and in cooperation with the face prevents the leakage of the cooling air from blade root cavities which are disposed about the periphery of the disk.

A primary advantage of the present invention is reduced stress due to a reduction in the moment arm between the bearing point of each sideplate on its corresponding lug and the base of the lug which reduces the maximum stress in the disk. Additionally, the inclined surface of each sideplate in cooperation with the lug arcuate surface urges each sideplate against the corresponding disk face to axially seal the blade root cavities of the disk.

The foregoing and other objects, features and advantages of the present invention will become more apparent in the light of the following detailed description of the preferred embodiment thereof as shown in the accompanying drawing.

BRIEF DESCRIPTION OF THE DRAWING

FIG. 1 is a cross section view of a portion of the turbine section of a gas turbine engine showing sideplates attached to the upstream and downstream faces of the turbine disk;

FIG. 2 is a partially broken away side view of the portion of the wheel assembly shown in FIG. 1 as viewed in the direction 2—2; and FIG. 3 is an enlarged cross section view of the point of engagement between the sideplates and disk of FIG. 1 in accordance with the present invention.

DESCRIPTION OF THE PREFERRED EMBODIMENT

A portion of the turbine section of a gas turbine engine is shown in cross section in FIG. 1. A single vane 10 is affixed to a stationary case structure 12 to form a turbine nozzle assembly. A portion of a turbine wheel assembly 14 is shown immediately downstream of the nozzle assembly. A plurality of turbine blades as represented by the single blade 16 is affixed to a turbine disk 18 having an axis 20, an upstream face 22 and a downstream face 24, the upstream and downstream faces being perpendicular to the axis. A plurality of segmented sideplates 26 is attached to the disk by rivets 28. As is shown in FIG. 2 each turbine blade has a root section 30 which engages a corresponding root cavity 32 in the turbine disk and a platform 34 positioned above the rim 36 of the disk, which, adjacent blade platforms and root sections, forms a platform cavity 38. A plurality of sideplate retaining lugs 40 each having an arcuate surface 42 face radially inward toward the axis of the turbine disk. Each disk 18 further has a circumferential groove 44 undercutting the arcuate surface 42 of each retaining lug 40 as shown in FIG. 3. Each segmented sideplate 26 has an inclined bearing surface 46 which is engaged by one or more disk lugs and is inclined at an angle θ to the arcuate surface 42 of each engaged lug. The turbine disk is a principal structural member of the wheel assembly and is designed to carry centrifugally generated structural loads. The turbine blades and sideplates mounted on each disk are thrust radially by centrifugal forces during rotation of the wheel assembly until they engage corresponding retaining surfaces on the disk. In the preferred embodiment shown the root cavities 32 of the turbine disk engage and retain the turbine blades and the disk lugs 40 engage and retain the sideplates. The disk and blade attachment is conventional in all respects; however, the bearing surface 46 of the sideplate which engages the disk lug is inclined at an angle θ to the arcuate surface of each retaining lug. Additionally the arcuate surface of each lug is undercut as is shown in FIG. 3 to receive the radially most outward portion of the sideplate surface.

In modern gas turbine engines the wheel assembly rotates at speeds in excess of 7,500 revolutions per minute. The centrifugal forces generated by the sideplate on the rotating wheel assembly are opposed by the disk lug. The retaining forces are applied at the point of contact between the sideplate and the disk lug and, resultantly, produce bending stresses at the base of the disk lug. In prior constructions the bearing surface of the sideplate was essentially parallel to the arcuate surface of the retaining lug and in this construction the moment arm ($M_1$) through which the retaining forces were applied extended from the base of each lug to the mid point of the contacting surfaces as is shown in FIG. 3. In the preferred construction the length of the moment arm ($M_2$) is significantly reduced where compared to $M_1$ by inclining the bearing surface of the sideplate at an angle θ to the arcuate surface of the retaining lug.

Prior to the present invention a particular wheel construction having the moment arm $M_1$ experienced maximum bending stresses of 58,000 pounds per square inch at the base of each disk lug during the engine take-off condition. At this maximum stress the construction tested has a limited low cycle fatigue life, LCF, of between 1,200 to 1,500 cycles, each cycle comprising a typical take-off cruise and landing condition. The same wheel assembly having an identical lug thickness but incorporating the undercutting groove 44 as is shown in FIG. 3 and having the improved sideplate including the bearing surface inclined at an angle of 6° to the arcuate surface of the disk lug, was tested under the same conditions and experienced maximum stresses of 32,500 pounds per square inch in the base of each lug. Correspondingly the LCF life of the improved disk having identical lug thickness was increased to between 7,000 and 8,000 cycles. Although an inclined angle of 6° performed satisfactorily it is expected that any angle between 2° and 10° would provide effective stress reductions.

In addition to reducing the propensity of the disk lugs for stress cracking, the construction of the present invention improves sideplate sealing in the vicinity of the blade root cavities. One important function of the turbine sideplates is to block the flow of air through the interfaces between the blade roots and the disk root cavities in a direction from the high pressure to the low pressure sides of the disk and blade assembly. In the present constructions centrifugal forces acting at the point of contact between the inclined bearing surface 46 of the sideplate and the arcuate surface 42 of the retaining lug urge each segmented sideplate in the axial direction toward the corresponding perpendicular face of the disk. The axial forces exerted by the sideplate on the perpendicular face of the disk tend to hold the sideplate flat against the disk to improve sealing in the vicinity of the disk root cavities.

Further benefit is achieved by this axial deployment of each turbine sideplate. In the conventional wheel construction tested the tensile stress in the rivets 28 was 9,280 pounds per square inch. In the preferred embodiment constructed in accordance with the present invention the tensile stresses in the rivets were reduced to 7,990 pounds per square inch.

The undercutting groove 44 receives the radially most outward portion of the inclined bearing surface of the corresponding sideplate. Concomitantly the undercutting groove reduces the concentration of stresses at the juncture between the side of the disk and the arcuate surface of the lug, although the stresses are principally reduced by shortening the moment arms.

Although the invention has been shown and described with respect to a preferred embodiment thereof, it should be understood by those skilled in the art that various changes and omissions in the form and detail thereof may be made therein without departing from the spirit and the scope of the invention.

CLAIMS

Having thus described a typical embodiment of my invention, that which I claim as new and desire to secure by Letters Patent of the United States is:

1. For use in gas turbine engines, a turbine wheel assembly comprising:
   a plurality of turbine blades, each having a root section;
   a disk having
   an axis of rotation,
   a face perpendicular to the axis of rotation, a plurality of root cavities disposed about the circumference of the disk, each cavity receiving the root section of a corresponding turbine blade, and a plurality of sideplate retaining lugs extending from the perpendicular face between root cavities, each lug having an arcuate surface facing radially inward toward the axis of rotation; and a plurality of sideplates attached to the disk, each sideplate having an inclined bearing surface which opposes and is inclined with respect to the arcuate surface of one or more disk lugs whereby line contact engagement therebetween is effected, the most radially outward point on the inclined surface being in closest proximity to the perpendicular face of the disk.

2. The invention according to claim 1 wherein the bearing surfaces of the sideplates are inclined at an angle within the range of 2° to 10° with respect to the arcuate surfaces of the disk lugs.

3. The invention according to claim 1 wherein the bearing surfaces of the sideplates is inclined at an angle of 6° with respect to the arcuate surfaces of the disk lugs.

4. The invention according to claim 1 wherein the disk has a circumferentially extending groove undercutting the arcuate surface of each retaining lug at the juncture of the lug with the corresponding perpendicular face of the disk.

5. A rotatable disk and blade assembly comprising a turbine disk including a plurality of blade root cavities disposed about the periphery of the disk and a plurality of sideplate retaining lugs on at least one side of the disk, each lug extending between two adjacent root cavities and having an arcuate surface facing radially inward toward the axis of rotation of the disk and blade assembly, a plurality of turbine blades each having a root which engages one of the root cavities, and a plurality of segmented sideplates affixed to at least one side of the disk including a bearing surface inclined with respect to said arcuate surface and having its most radially outward portion in closer proximity to the side of the disk than its most radially inward portion, the inclined bearing surface being operatively positioned so as to engage with line contact one or more of the arcuate surfaces of the disk lugs during rotation of the disk and blade assembly.

6. The invention according to claim 5 wherein the bearing surface of each sideplate is inclined at an angle within the range of 2° to 10° with respect to the arcuate surface of the disk lugs.

7. The invention according to claim 5 wherein the bearing surface of each sideplate is inclined at an angle of 6° with respect to the arcuate surface of the disk lugs.

8. The invention according to claim 5 wherein the disk has a circumferentially extending groove undercutting the arcuate surface of each retaining lug at the juncture of the lug with the corresponding side of the disk.

* * * * *